US009938393B2

(12) United States Patent
Schneiter et al.

(10) Patent No.: US 9,938,393 B2
(45) Date of Patent: Apr. 10, 2018

(54) RADIALLY GRADED FULLY DENSE INORGANIC FILAMENTS FOR ENHANCED STRENGTH AND CREEP RESISTANCE

(71) Applicant: FREE FORM FIBERS, LLC, Saratoga Springs, NY (US)

(72) Inventors: John L. Schneiter, Cohoes, NY (US); Joseph Pegna, Saratoga Springs, NY (US); Ramkiran Goduguchinta, Ballston Lake, NY (US); Kirk L. Williams, Saratoga Springs, NY (US); Shay Llewellyn Harrison, East Schodack, NY (US)

(73) Assignee: FREE FORM FIBERS, LLC, Saratoga Springs, NY (US)

( * ) Notice: Subject to any disclaimer, the term of this patent is extended or adjusted under 35 U.S.C. 154(b) by 80 days.

(21) Appl. No.: 15/003,915

(22) Filed: Jan. 22, 2016

(65) Prior Publication Data

US 2016/0215417 A1    Jul. 28, 2016

Related U.S. Application Data

(60) Provisional application No. 62/106,910, filed on Jan. 23, 2015.

(51) Int. Cl.
| C23C 16/00 | (2006.01) |
| C08K 3/38 | (2006.01) |
| C04B 35/80 | (2006.01) |
| C08K 3/02 | (2006.01) |
| C08K 3/14 | (2006.01) |
| C08K 3/34 | (2006.01) |
| C04B 35/622 | (2006.01) |

(52) U.S. Cl.
CPC .......... *C08K 3/38* (2013.01); *C04B 35/62277* (2013.01); *C04B 35/62281* (2013.01); *C04B 35/80* (2013.01); *C08K 3/02* (2013.01); *C08K 3/14* (2013.01); *C08K 3/34* (2013.01); *C04B 2235/5264* (2013.01); *C04B 2235/781* (2013.01)

(58) Field of Classification Search
CPC ... C08K 3/02; C08K 3/14; C08K 3/34; C08K 3/38; C04B 35/62272
See application file for complete search history.

(56) References Cited

U.S. PATENT DOCUMENTS 4,076,380 A * 2/1978 DiMarcello ......... C03B 37/0142
                                                           385/124
5,342,022 A * 8/1994 Artjushenko ......... C03B 37/023
                                                           264/1.21
(Continued)

OTHER PUBLICATIONS

Zimmerman et al. Fragmentation-driven grain refinement in directional solidification of AlCu10wt-% alloy at low pulling speeds, Acta Materialia 126 (2017) pp. 236-250.*

(Continued)

*Primary Examiner* — Kelly M Gambetta
(74) *Attorney, Agent, or Firm* — Kevin P. Radigan, Esq.; Heslin Rothenberg Farley & Mesiti P.C.

(57) ABSTRACT

A fully dense ceramic and/or other inorganic fiber containing elongated crystal grains in and around the fiber center and oriented along the fiber axis, with a smooth transition to more equiaxed grains towards the radial periphery of the fiber, and method for producing such.

6 Claims, 2 Drawing Sheets

(56) References Cited

U.S. PATENT DOCUMENTS

| | | | | |
|---|---|---|---|---|
| 5,399,430 | A | * | 3/1995 | Nordine ................. B82Y 30/00 428/364 |
| 5,786,023 | A | * | 7/1998 | Maxwell ................. C23C 26/00 264/40.1 |
| 6,322,889 | B1 | * | 11/2001 | Lara-Curzio ......... C04B 35/565 428/378 |
| 6,706,400 | B2 | | 3/2004 | Mercuri et al. |
| 9,217,210 | B2 | | 12/2015 | Velev et al. |
| 2011/0124483 | A1 | | 5/2011 | Shah et al. |

OTHER PUBLICATIONS

Ares et al. Columnar-to-Equiaxed Transition in Metal-Matrix Composites Reinforced with Silicon Carbide Particles, Hindawi Publishing Corporation, Journal of Metallurgy, vol. 2013, Article ID 628495, 12 pages.*

Luo et al. Microstructure, tensile strength and thermostability of W-core SiC fibers with or without carbon coating, Materials Science & Engineering A 647 (2015) pp. 265-276.*

Gan, Structural assessment of nanocomposites, Micron 43 (2012) pp. 782-817. (Year: 2012).*

Schneiter et al., International Search Report for PCT Application No. PCT/US2016/014432, dated Sep. 7, 2016 (2 pages).

* cited by examiner

RADIALLY GRADED FULLY DENSE INORGANIC FILAMENTS FOR ENHANCED STRENGTH AND CREEP RESISTANCE

GOVERNMENT INTEREST

This invention was supported by NSF Phase IIB Contract #1152698, "The Digital Spinneret".

TECHNICAL FIELD

The present invention relates to unique high performance ceramic and other inorganic fibers, and methods of their manufacture.

BACKGROUND OF THE INVENTION

High Performance Fibers (HPFs) are being proposed for expanding uses in many specialized applications, such as military and aerospace (turbo machinery, rockets, advanced structures), automobile, biomedical, energy, and other applications that require advanced materials with exceptional strength, stiffness, heat resistance, and/or chemical resistance. HPFs are sought when a combination of extreme material properties is required which cannot be met by existing metal filaments or by carbon, glass, vegetal or mineral fibers, or by synthetic polymer fibers. HPF composite systems generally include a plurality of coated fibers, distributed within a "matrix." When the fibers are ceramic and the matrix is a ceramic, the resultant composite structure is usually referred to as a Ceramic Matrix Composite or CMC. When the matrix is a metal, the resultant composite structure is called a Metal Matrix Composite or MMC. When the matrix is polymer-derived the composite is a Polymer Matrix Composite or PMC.

Composites derive their gross mechanical properties from the properties of the fiber and matrix constituents. In particular, the fiber properties most highly valued by designers of MMCs and CMCs are: stiffness as measured by Young's Modulus; tensile strength as measured by loading fibers to tensile failure; and creep resistance or resistance to "stretching" during high temperature loading.

Existing commercial inorganic fibers are produced via a process that forces a liquid polymeric precursor containing atoms of interest (along with other elements that together create the liquid) through a spinneret, which is a structure reminiscent of a shower head with a plurality of holes through which the precursor liquid is extruded. The volatile chemical species are flashed off in this process, thereby producing "green" fiber which is then transported to a furnace or kiln to attempt to drive off the remaining unwanted elements. These elements can only asymptotically be driven off, which means that unwanted elements remain in the fiber, thereby affecting fiber properties, in particular survivability at high temperatures, but also fiber microstructure which affects other properties such as stiffness, tensile strength and creep resistance.

Fibers produced via the spinneret process typically exhibit islands of generally equiaxed crystalline material surrounded by amorphous material which includes unwanted elements. The crystals are generally equiaxed in that crystal grains show no particular elongation or aspect ratio, and are randomly oriented and distributed throughout the fiber. This combination of crystal and amorphous material gives rise to a set of stiffness, tensile strength and creep resistance properties associated with the process, post-processes and the fiber material system of interest (eg silicon carbide, boron carbide, tungsten carbide, etc.), all of which can be improved upon by the present invention.

SUMMARY OF THE INVENTION

The shortcomings of the prior art are addressed, and additional advantages are provided, by the present invention which in one aspect is a major improvement in the crystal microstructure of the fibers.

Fibers with significantly improved properties can be produced via the process of Chemical Vapor Deposition (CVD) or Physical Vapor Deposition (PVD). In particular, Maxwell and Pegna (U.S. Pat. No. 5,786,023, hereby incorporated herein by reference in its entirety) teach that a laser can be used with appropriate precursor gases to cause directed solid material buildup of a variety of materials, using a process called Laser-assisted CVD (LCVD). Nordine et al. (U.S. Pat. No. 5,399,430, hereby incorporated herein by reference in its entirety) teaches that inorganic fibers can be produced using LCVD and liquid and/or gaseous precursors.

Considerable work has been done in the past five years by the inventors to explore fiber properties arising from CVD processing. In particular, it has been discovered that in certain processing regimes (precursor gases and temperature gradients at the fiber growth surface during growth) the resultant fibers exhibit a "composite" structure in that the internal crystalline microstructures are varied and distributed radially without discontinuity. Specifically, fibers produced in these CVD parameter regimes exhibit nano-crystalline grain structures, with elongated crystal grain structures in and near the fiber center, with more and more equiaxed grains (having approximately equal dimensions in all directions) as one moves radially outwards towards the fiber periphery. It is understood that this is due to the higher temperatures to be found in the fiber center during thermally induced CVD growth, along with the longer dwell times the fiber center experiences at high enough temperature for grain growth as compared with temperatures and dwell times at more radially distal positions.

Fibers produced with this "composite" structure have been found to be fully dense, with a stiffness (Young's Modulus) approaching that of theoretical maximum for the material, and tensile strength far above what is seen in commercially available spinneret-produced fibers. In addition, comparative creep tests of such fibers also indicate considerably better performance. In particular, experiments with silicon carbide (SiC) filaments formed via LCVD indicate a flexural Young's Modulus of the order of 400 GPa. Taking into account the grain size radial distribution, a tensile Young's modulus of 450-550 GPa can be expected. Tensile strength was measured between 3 and 4 GPa. This is to be compared with 420 GPa and 2.6 GPa, respectively, for one of the highest performing commercially available SiC fibers called Hi-Nicalon Type-S. Creep resistance measurement using the NASA Bend Stress Relaxation (BSR) test indicates significantly higher performance for LCVD-derived fiber as compared with Hi-Nicalon Type-S as well.

In that regard, the present invention is in one aspect a dense ceramic and/or other inorganic fiber containing elongated crystal grains in and around the fiber center and oriented along the fiber axis, with a smooth transition to more equiaxed grains towards the radial periphery of the fiber.

The present invention, in another aspect, is a method of forming a ceramic and/or other inorganic fiber (or a plurality of fibers) containing elongated crystal grains in and around the fiber center and oriented along the fiber axis, with a smooth transition to more equiaxed grains towards the radial periphery of the fiber. The fiber may be grown according to Chemical Vapor Deposition (CVD). A focused source of heat energy may be directed to a seed substrate or the fiber tip in the presence of CVD precursor gases to impose a high temperature gradient on the order of $10^5$ to $10^{6\circ}$ K/cm on the fiber tip; wherein the focused heat source is derived from a laser, electron beam, x-ray beam, electric arc, or any other source of focusable directed thermal power, or a plurality thereof.

A composite part containing fibers may be formed, as a Ceramic Matrix Composite, Metal Matrix Composite or Polymer Matrix Composite.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed at the conclusion of the specification. The foregoing and other objects, features, and advantages of the invention are apparent from the following detailed description taken in combination with the accompanying drawings in which:

DETAILED DESCRIPTION OF THE INVENTION

Disclosed below is one instantiation of a method by which radially graded fully dense inorganic filaments may be produced. Those schooled in the art will understand that other techniques may be used, for example focused light energy from an arc source or focused electron or x-ray beams to provide localized heating for local precursor breakdown and functionally graded crystal grain growth at the filament tip.

Figure 1:
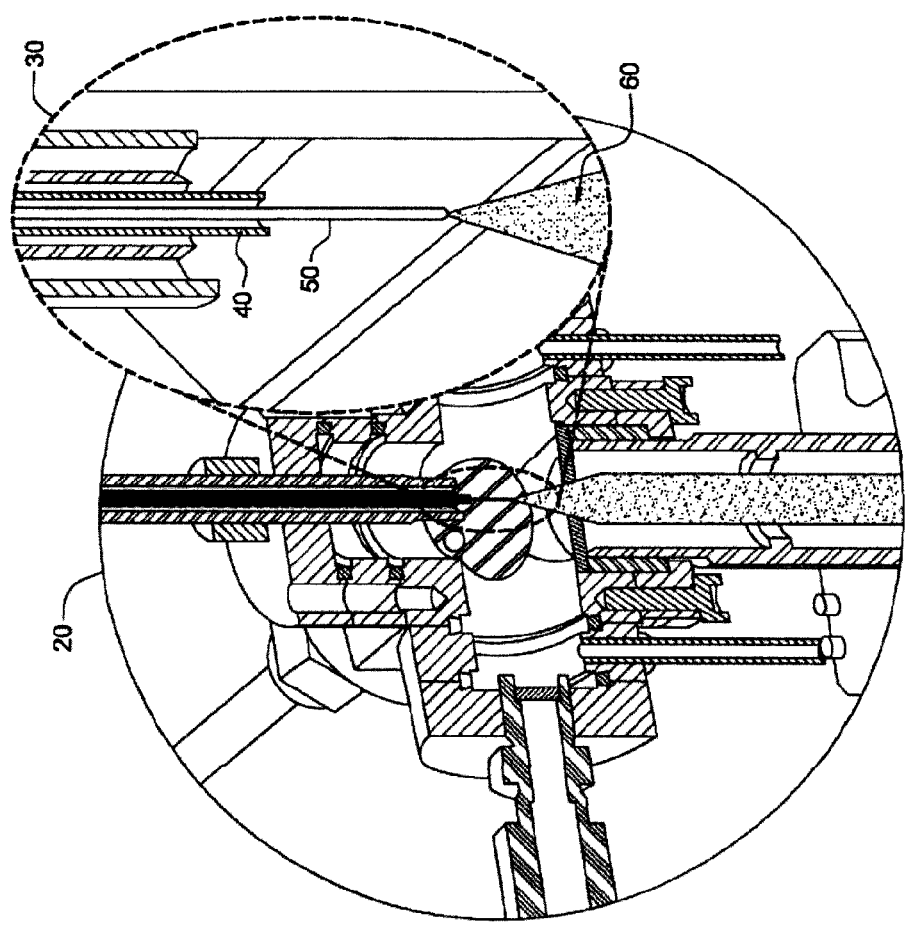
FIG. 1 is a schematic representation of a Laser-assisted CVD reactor [20] illustrating a reaction chamber [30], seed fiber [50], a focused laser beam [60] and fiber extrusion guide [40]
Figure 2:
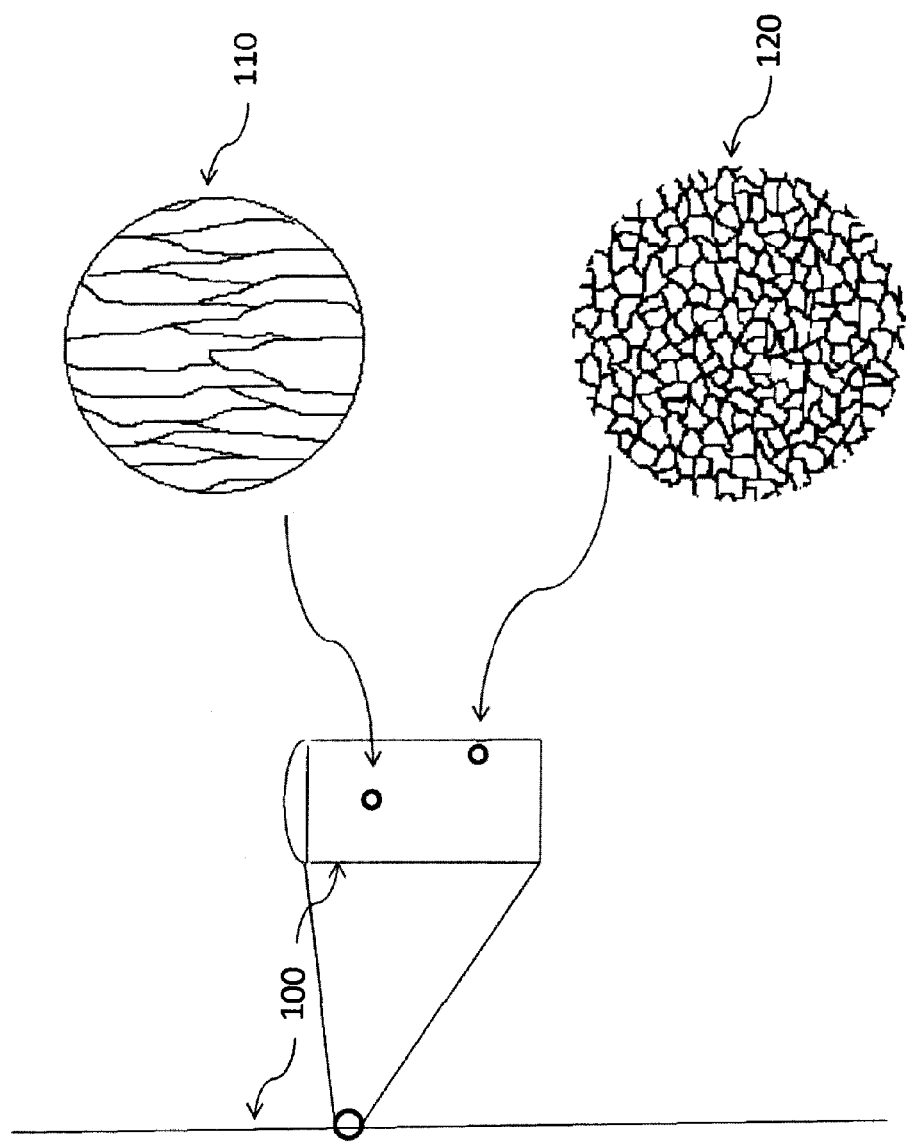
FIG. 2 is a schematic representation of the invention, illustrating a fiber [100], a region of fully dense elongated crystal grains [110] located in and around the fiber's central axis, and a region of fully dense equiaxed crystal grains [120] located near the fiber's radial edge.

FIG. 1 shows a simple preferred embodiment of a Laser-assisted CVD method for producing inorganic filaments. A seed fiber [50] is introduced into a chamber [30] containing appropriate precursor gases. A focused laser beam [60] is directed through a chamber window onto the fiber tip [50]. The fiber tip is heated to a temperature sufficient for the gases to break down locally at the tip, causing chemical vapor deposition to occur. The fiber will grow towards the laser at a rate determined by the precursor gases and local fiber temperature gradient, and if the fiber is pulled away from the laser at that rate, thereby keeping the fiber tip within the laser focus, it is evident that a continuous solid monofilament can be pulled out of the gas for as long as the laser heats the fiber tip and there is sufficient precursor gas to supply CVD growth. It will be understood that any directed, focused source of heat can be used instead of a laser, such as a focused arc source or focused electron or x-ray beams, among others. FIG. 2 is a schematic representation of the invention, illustrating a fiber [100], a region of fully dense elongated crystal grains [110] located in and around the fiber's central axis, and a region of fully dense equiaxed crystal grains [120] located near the fiber's radial edge.

Specifically, it has been found that using silane as a source of silicon atoms and ethylene as a carbon contributor (although other gases may be used such as trichlorosilane and methane, respectively) and by imposing a focused temperature gradient on a seed substrate on the order of $10^8$ to $10^9$ degrees Kelvin per centimeter (° K/cm), a silicon carbide filament can be grown that exhibits superior mechanical properties approaching those of ultrapure-pure bulk silicon carbide. Such filaments exhibit a flexural Young's Modulus of about 400 GPa and a tensile strength of between 3 and 5 GPa. When fibers produced in this way are examined using Transmission Electron Microscopy (TEM) techniques, it is found that the fiber is fully dense 3-C β silicon carbide with elongated grain structures in the fiber center oriented along the fiber axis, with the grains becoming more equiaxed as one shifts attention to the fiber periphery. In a sense the fiber is a "composite" structure with radius-dependent variable grain structure.

For the case of silicon carbide filaments produced by LCVD using silane, ethylene and a growth temperature gradient of $10^5$ to $10^{6\circ}$ K/cm, the resulting fibers are on the order of 25-40 microns (μm) in diameter, with elongated crystallites on the order of 20 nm long and 5 nm wide, up to 100 nm long and 20 nm wide. The crystallites become more equiaxed as one moves radially toward the fiber periphery, with sizes on the order of 5-20 nm, respectively.

Similarly, by using boron trichloride as a boron contributor and ethylene for carbon (although other gases may be used such as diborane and methane, respectively) and by imposing a temperature gradient of $10^8$ to $10^{9\circ}$ K/cm on the substrate, a fully dense boron carbide fiber will grow that exhibits similar grain structures as are found in silicon carbide, that is, elongated grains near the fiber center and more equiaxed grains towards the periphery. Inorganic fibers of other materials such as boron and tungsten carbide can be made with similar grain structures and distributions. One only needs appropriate precursors and the appropriate temperature gradient from a thermal energy source in order to make a wide variety of fibers that exhibit such grain structures and distributions.

It is understood that the elongated grains occur because of the geometry and temperature profiles of the filament during growth. The fiber center is hotter for longer during CVD growth using this technique which allows for grain growth along the fiber axis, while the shorter temperature dwell time towards the fiber periphery tends to inhibit grain growth with resultant smaller and more equiaxed grains.

It is well known that the mechanical properties of ceramic and other inorganic solids are a strong function of crystal properties and density within the bulk solid. Specifically, for a ceramic or other inorganic solid with densely packed, uniformly distributed equiaxed crystal grains of similar size, tensile strength tends to increase with decreasing grain size down to a limit of about 5-10 nm. It is also well known that material stiffness for a given ceramic or other inorganic solid is highest when the material is in single crystal form. In the present invention both fine densely packed crystallites are present as well as densely packed elongated single crystal grains, which confers on the fiber the benefits of all three conditions (fully dense, fine equiaxed grains and elongated crystals): higher tensile strength as well as higher stiffness. The theory of high temperature creep is as yet insufficient to make strong predictions about the creep behavior of inorganic fibers, but experiments indicate that the creep behavior of such "composite" fibers is superior to fibers produced by the liquid precursor/spinneret process.

Unique features of the present invention include ceramic or other inorganic filaments or fibers that are fully dense as compared with fibers produced via the spinneret process, and that have a "composite" grain structure with elongated grains near the center and more equiaxed grains out towards the radial periphery, thereby exhibiting improved stiffness, tensile strength and high temperature creep resistance as compared with such other fibers.

Advantages of the present invention include full density fibers with stiffness, tensile strength and high temperature creep resistance approaching that associated with pure bulk solids of the same material (eg silicon carbide, boron carbide, boron, tungsten carbide, etc.).

Further advantages inure to CMC, MMC and/or PMC composite parts using fibers that are the subject of this invention. Such parts are expected to exhibit improved stiffness, creep resistance and fracture toughness, all of which are important performance measures of composite parts.

An additional advantage of this invention is that the transition from elongated crystal grains in and around the fiber center, to more equiaxed grains radially outward, is smooth with little or no discontinuity. This serves to prevent stress concentrations within the fiber that might cause it to fail under load.

What is claimed is:

1. A method comprising:
forming a ceramic and/or other inorganic fiber of a single material, the ceramic and/or other inorganic fiber containing elongated crystal grains in and around the fiber center and oriented along the fiber axis, with a smooth transition from the elongated crystal grains in and around the fiber center to equiaxed grains at the radial periphery of the fiber without discontinuity.

2. The method of claim 1, wherein the fiber is grown according to Chemical Vapor Deposition (CVD).

3. The method of claim 1, wherein a focused source of heat energy is directed to a seed substrate or the fiber tip in the presence of CVD precursor gases to impose a high temperature gradient on the order of $10^5$ to $10^{6\circ}$ K/cm on the fiber tip.

4. The method of claim 3, wherein the focused heat source is derived from a laser, electron beam, x-ray beam, electric arc, or any other source of focusable directed thermal power, or a plurality thereof.

5. A dense ceramic and/or other inorganic fiber formed of a single material, the dense ceramic and/or other inorganic fiber containing elongated crystal grains in and around the fiber center and oriented along the fiber axis, with a smooth transition from the elongated crystal grains in and around the fiber center to equiaxed grains at the radial periphery of the fiber without discontinuity.

6. A composite part comprising:
a plurality of fibers, the fibers of the plurality of fibers being ceramic and/or other inorganic fibers formed of a single material, and each fiber containing elongated crystal grains in and around the fiber center and oriented along the fiber axis, with a smooth transition from the elongated crystal grains in and around the fiber center to equiaxed grains at the radial periphery of the fiber without discontinuity; and
wherein the composite part is a Ceramic Matrix Composite, Metal Matrix Composite, or Polymer Matrix Composite.

* * * * *